United States Patent

[11] 3,570,715

[72] Inventor Anders Evers
6300 S.W. Richey Lane, Portland, Oreg. 97223
[21] Appl. No. 774,001
[22] Filed Nov. 7, 1968
[45] Patented Mar. 16, 1971

[54] DISPENSING SYSTEM
2 Claims, 11 Drawing Figs.
[52] U.S. Cl. .................................................. 222/54,
222/63, 222/70, 222/318
[51] Int. Cl. .................................................. B67d 5/08
[50] Field of Search .......................................... 222/20, 54,
63, 56, 64, 146 (H), 318; 126/362; 237/63

[56] References Cited
UNITED STATES PATENTS
| | | | |
|---|---|---|---|
| 2,018,538 | 10/1935 | Webb | 222/54X |
| 2,646,189 | 7/1953 | Wickesberg | 222/70X |
| 3,007,470 | 11/1961 | Heeger | 126/362 |

*Primary Examiner*—Samuel F. Coleman
*Assistant Examiner*—H. S. Lane
*Attorney*—Walter M. Rodgers ABSTRACT: A predetermined quantity of hot liquid is supplied from a delivery reservoir to a whipper chamber to which a measured quantity of powder such as powdered chocolate is supplied by a motor driven auger. Whipping action is effected in the shipper chamber by means of a motor driven impeller and the mixed product is dispensed through a dispensing outlet into a receptacle therebelow. The receptacle is effective when placed below the dispensing outlet to initiate the operation by engagement with a pivotally mounted control bracket which when moved initiates a control action and the resultant aforementioned operation. Hot liquid in the delivery reservoir is supplied thereto by a motor driven pump controlled by the control system from a supply reservoir in which hot liquid is maintained at all times. Flow of hot liquid from the delivery reservoir into the whipper chamber is controlled by a solenoid control valve, the action of which is predetermined by a motor driven timing means.

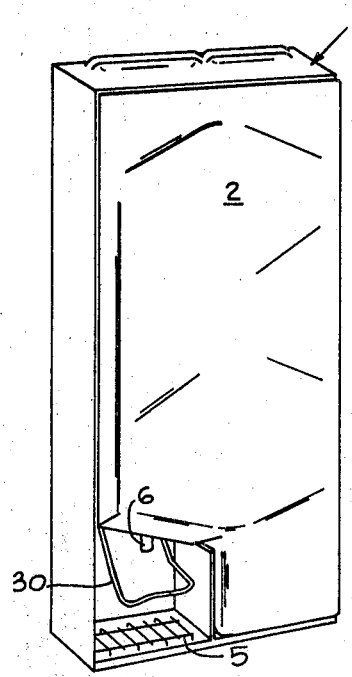
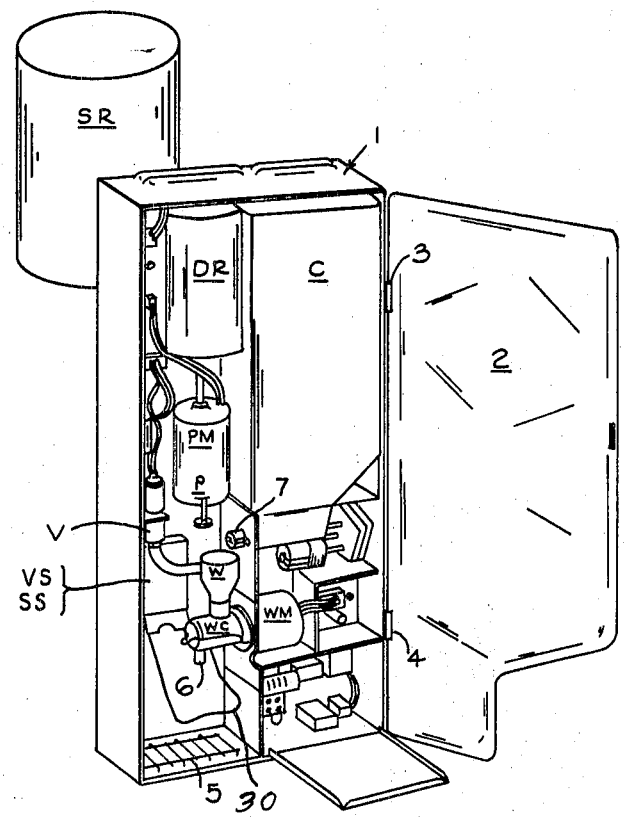
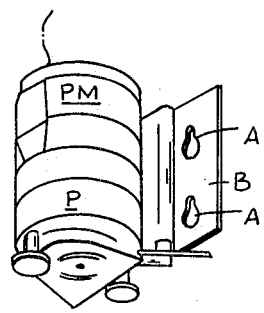
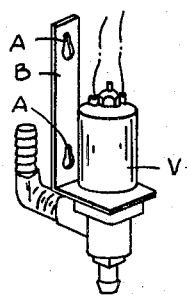
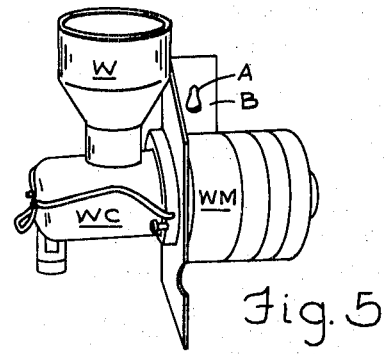
Fig. 1
Fig. 2
Fig. 3
Fig. 4
Fig. 5
INVENTOR
ANDERS EVERS
BY: Walter M. Rodgers
ATTORNEY

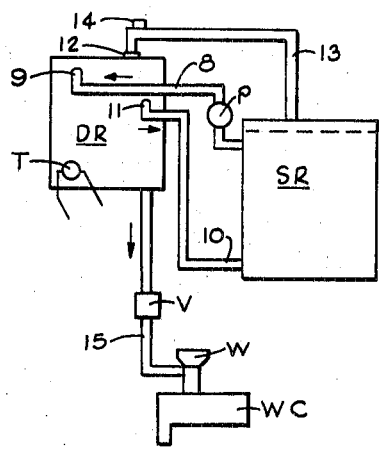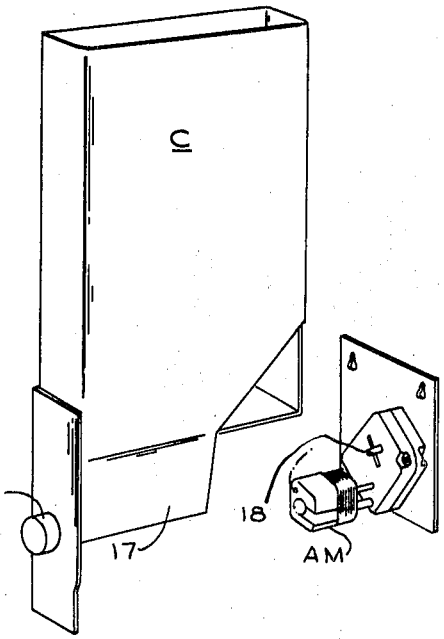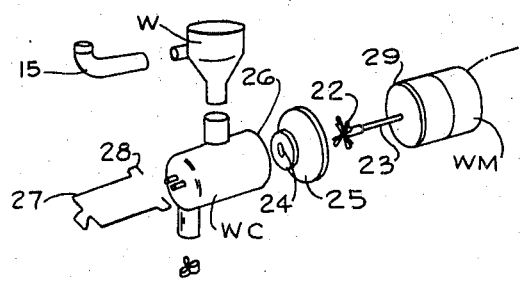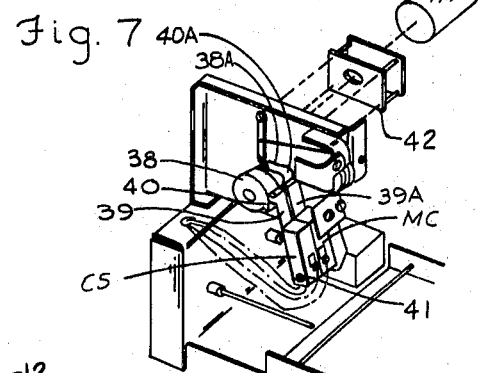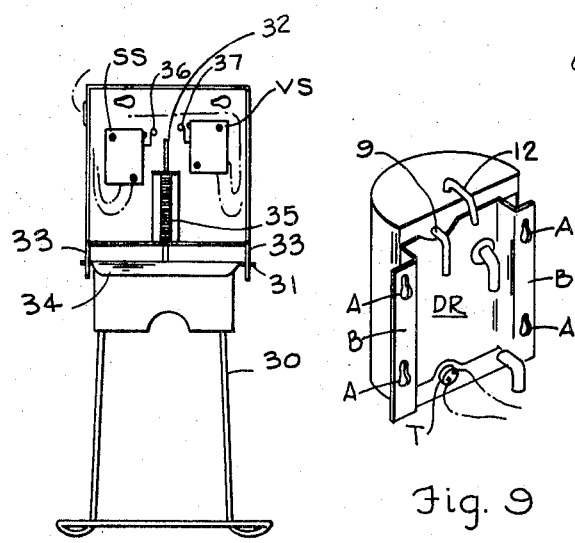

DISPENSING SYSTEM

According to the invention, a predetermined amount of hot liquid is supplied from a delivery reservoir by gravity action through a time controlled outlet, the liquid level in the delivery reservoir being maintained substantially constant. More specifically, a motor driven pump is arranged to supply liquid from the supply reservoir to the delivery reservoir at a rate at least equal to or preferably greater than the maximum rate at which liquid is supplied to the whipper chamber through the supply outlet from the delivery reservoir. The liquid level and the resulting head by which liquid is supplied to the chamber is maintained at a substantially constant level by means of a level control outlet from the delivery reservoir which is interconnected by a return conduit with the supply reservoir. According to one facet of the invention, temperature responsive means associated with the delivery reservoir is arranged to actuate the motor driven pump when temperature in the delivery reservoir is reduced below a predetermined level and the supply of liquid from the supply reservoir is shut off by the temperature responsive means when the temperature in the delivery reservoir exceeds the predetermined level.

For a better understanding of the invention, reference may be had to the following detailed description taken in conjunction with the accompanying drawings in which:

FIG. 1 is a perspective view of a cabinet containing the principal components of a dispensing system constructed according to the invention;

FIG. 2 is a perspective view similar to FIG. 1 but showing the front closure panel of the cabinet in the open position;

FIG. 3 is an enlarged perspective view of a solenoid control valve depicted in FIG. 2 and which forms an essential part of the system;

FIG. 4 is an enlarged perspective view of a motor driven pump depicted in FIG. 2 and forming an essential element of the invention;

FIG. 5 is an enlarged perspective view of a whipper chamber and its associated whipper motor and which is depicted in FIG. 2;

FIG. 6 is a schematic overall view of a system embodying a delivery reservoir and a supply reservoir and related conduits associated therewith;

FIG. 7 is an exploded view of the whipper chamber together with the associated whipper motor, supply canister, auger, and auger motor;

FIG. 8 is an enlarged view of a control bracket and its associated switch mechanism;

FIG. 9 is a perspective view of the delivery reservoir and which is taken from the rear thereof;

FIG. 10 is an enlarged perspective view of a cam operated motor driven switch mechanism forming an essential element of the system.

Figure 11:
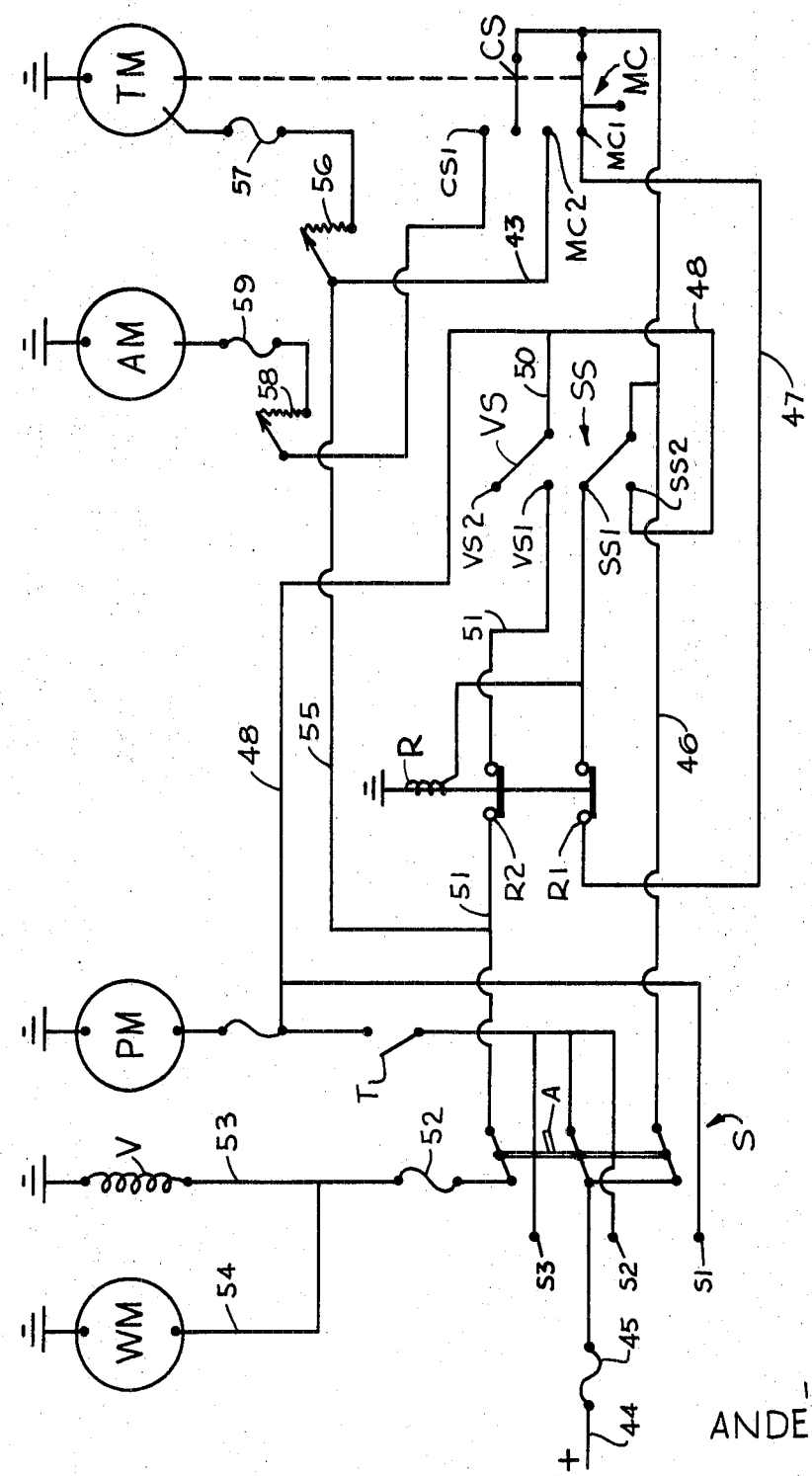
FIG. 11 is a schematic diagrammatic representation of the various components of the system and depicting the manner in which such components are electrically interconnected.

In the drawings the numeral 1 generally designates the main body of a cabinet to which the front closure panel 2 is hingedly adjoined by hinges 3 and 4. A grill 5 constitutes a support on which a receptacle such as a drinking cup may rest during dispensing of a beverage from the dispensing outlet 6.

The basic components of the system are depicted in FIG. 2 and comprise a supply reservoir SR in which a substantial quantity of liquid at a desired temperature is maintained at all times. Mounted within the cabinet 1 is a delivery reservoir DR into which heated liquid is supplied from supply reservoir 1 through suitable conduit means. A canister C contains a powdered substance such as chocolate and such material is supplied to whipper W through an outlet indicated by the numeral 7. Liquid such as water is supplied by suitable conduit means from delivery reservoir DR through solenoid controlled valve V to the whipper chamber W. Upon completion of a mixing operation, the mixed contents are discharged through the dispensing outlet 6 into the receptacle disposed therebelow.

A whipper impeller disposed within the whipping chamber WC is driven by a whipper motor WM. Liquid such as water is maintained at a predetermined level in the delivery reservoir DR by means of the pump P which is actuated by a motor designated PM.

The components of the system are removably mounted in the cabinet 1 by means of base plates B having dimpled apertures designated by the letter A as best shown in FIGS. 3, 4, 5 and 9, for example. Of course the enlarged head portion of a supporting pin mounted on the housing 1 is received within the enlarged part of the dimpled apertures A and when the base plate B of the various components is lowered the enlarged head (not shown in the drawings) prevents removal of the base plate B by simply riding into the narrowed upper portion of the dimpled apertures A.

The liquid supply system is best shown in FIGS. 6 and 9. The supply reservoir SR is interconnected through pump P and supply conduit 8 to the supply inlet 9 of the delivery reservoir. A return conduit 10 interconnects the delivery reservoir DR level control outlet 11 with the supply reservoir SR. An overflow vent 12 is interconnected with the upper portion of delivery reservoir DR and if desired may be connected through a conduit 13 with the supply reservoir SR. A port 14 must be formed in the conduit 13 so as to afford venting from the interior of the delivery reservoir DR to atmosphere. The effect of the port 14 is to prevent undesired pressure buildup and the possible interference with the downward flow through conduit 15.

Liquid is supplied from delivery reservoir DR to the whipper W and its whipper chamber WC through outlet conduit 15 and solenoid controlled valve V. A thermostat T is affixed to the delivery reservoir DR as indicated in FIGS. 6 and 9.

For the purpose of supplying powder to the whipper W from the canister C, an auger 16 is provided and is arranged to rotate about a horizontal axis in the bottom V-shaped portion 17 of the canister C. Rotation of auger 16 is effected by auger motor AM which is interconnected with the auger 16 through shaft 18, spindle 19, and bracket 20 fixedly mounted in the right-hand end of auger 16. A cylindrical apertured and louvered grill 21 is mounted in the outlet tube 7. Thus operation of auger motor AM imparts rotary motion to auger 16 which in turn feeds powdered material from the bottom V-shaped troughlike portion 17 of the canister C through the outlet 7 and into the whipper W. The orientation of the various parts is most clearly evident from FIG. 2.

Once the liquid and powder are supplied to the whipper W and in turn to the whipper chamber WC, these materials must be thoroughly mixed. Toward this end and as is best shown in FIG. 7, an impeller 22 is affixed to the shaft 23 of whipper motor WM. The shaft 23 is disposed within the central aperture 24 formed in end plate 25 which normally is affixed to the right-hand end 26 of the whipper chamber WC. Of course the impeller 22 is disposed within the whipping chamber WC. The parts depicted in exploded form in FIG. 7 are maintained in assembled position by means of the bracket 27 which extends about the whipper chamber WC and is arranged with its jaws 28 disposed about the peripheral edge of plate 25 so as to hold the parts in the assembled positions depicted in FIG. 5.

A mixing and dispensing operation is initiated by the placement of a receptacle such as a drinking cup against the switch bracket 30. This action causes the switch bracket 30 to swing in a backward direction as viewed for example in FIGS. 1, 2 and 8. Since bracket 30 is pivotally mounted on outwardly extending projecting pins 31 in downwardly extending side brackets 33 and since the upper end of switch bracket 30 is provided with a forwardly extending panel 34 on which a vertically reciprocable plunger 32 rests, up and down motion is imparted to reciprocable plunger 32 which in turn actuates the control post 36 of safety switch SS and the starting post 37 of vending switch VS, the plunger 32 being biased downwardly by spring 35. The posts 36 and 37 are engaged sequentially with the engagement of safety switch post 36 preceding by an instant engagement of the actuating post 37 of the vend switch VS.

Subsequent control of the dispensing system is automatic and results from the action of timing motor TM which actuates through gearbox 42 the main cycle switch MC and the chocolate switch CS which are normally closed microswitches. Operation of the switches MC and CS is by means of two rotatable cams 38 and 38A driven by timing motor TM which in turn engage the switch operating arms 39 and 39A as best shown in FIG. 10. Thus when the high portions 40 and 40A of cams 38 and 38A engage the switch 39 and 39A these arms are swung into the switches CS and MC to open those switches. Since the switch MC must be operated prior to the operation of the chocolate switch CS, the switch MC is engaged and closed before the switch CS is closed.

The sequence of operations of the dispensing system may best be understood with reference to FIG. 11. In FIG. 11 a one-line diagram is used with energy being supplied from a source of positive potential such as a battery through the conduit 44 to each of the components and thence to ground. The power line 44 is interconnected with the main switch S through a suitable fuse 45. Initially the switch S occupies the closed position depicted in FIG. 11. This condition is thus of a standby power-on nature. During this standby period, the coil of relay R is energized through conductor 46, the contacts SS1 of the safety switch SS and of course when energized is sealed in by virtue of the circuit completed from ground, through coil R through the closed R1 contacts, conduit 47, the contacts MC1 of the main cycle switch MC and the conductor 46 and switch S, fuse 45, and line 44.

When a receptacle such as a drinking cup is placed so as to cause the actuating bracket 30 to swing about its pivot 31 first to close switch SS and thus to complete a circuit from conduit 46 through the contacts SS2 of safety switch SS and conductor 48 to the water pump PM. Of course, during this operation the relay remains energized by virtue of the holding circuit above described even though the switch contacts SS1 are now open.

Actuation of safety switch SS to the contacts SS2 resulted from engagement of plunger 32 with pin 36 as best shown in FIG. 8 and occurred a predetermined period of time before operation of the vend switch VS at which time plunger 32 engages operating post 37. Actuation of post 37 occurs when the drinking receptacle is in its extreme inward position and ready for receiving a mixture through the outlet 6. When in this position the vend switch is actuated to complete a circuit from conduits 48 and 50, through the contacts VS1 of the vend switch VS through conduit 51, contact R2, fuse 52 and conduits 53 and 54 to the solenoid of the water valve V and to the whipper motor WM. Simultaneously, a circuit is completed from conductor 51 through conduit 55, potentiometer 56 and fuse 57 to the timer motor TM. The water pump motor PM remains energized. The relay R remains energized and the machine begins to dispense water through valve V to whipper W.

Operation of timer motor TM first activates main cycle switch MC and in so doing completes a circuit through contacts MC2 of switch MC to timer motor TM through conductor 43 and potentiometer 56, and fuse 57. This operation also completes a circuit to the whipper motor WM and the valve V and opens contacts MC1 to break the seal-in holding circuit of relay R and the relay contacts R1 and R2 open. The water pump PM remains energized to contacts SS2 of switch SS.

Continued operation of motor TM then closes contacts CS1 of the chocolate switch CS and thus completes a circuit to auger motor AM through potentiometer 58 and fuse 59. Under these conditions, the timer motor TM, water pump PM, water valve V and whipper motor WM are activated and the machine is thus dispensing hot whipped chocolate into the cup.

The chocolate switch CS is deactivated in response to continued operation of the timer motor and this operation opens the contacts CS1 of the chocolate switch CS and deenergizes the auger motor AM. During deactivation of the auger motor, the timer motor, water pump, water valve and whipper motor remain energized and during this period hot water is supplied to the whipper chamber during the final moments of the dispensing cycle and subsequent to the supply of chocolate to the whipper chamber WC. This allows for the rinsing of the interior of the whipper chamber WC.

Continued operation of the timer motor actuates the main cycle switch MC and thus interrupts the circuit through its contacts MC2 which in turn deactivates the timer motor, the whipper motor and the water valve solenoid. During this period the water pump remains activated and hence maintains the level of liquid in the delivery reservoir DR at a predetermined desired level although the dispensing of hot whipped chocolate has ceased.

When the receptacle cup is removed partially from engagement with the actuating lever 30, the vend switch VS is actuated to its VS2 position and hence sets up the vend circuit for the succeeding cycle. During this operation the water pump remains actuated as explained through contacts SS2 and conductors 48 and 46.

When the receptacle cup is completely removed from the dispensing position, the actuating bracket 30 swings fully outward to the position, for example, as depicted in FIGS. 1 and 2. This action allows the safety switch SS to return to its normal position and a circuit is thus completed through the contacts SS1 of the safety switch SS to the coil of relay R. The relay when thus energized, establishes a circuit through its contacts R1 and through the contacts MC1 of the main cycle switch MC to provide the seal-in holding circuit for the relay as previously described. When the contacts SS1 of the safety switch are opened, the circuit to the water pump is deactivated and the machine is in condition for a subsequent cycle of operation.

For the purpose of maintaining the temperature of liquid in the delivery reservoir DR at a desired predetermined level, it is necessary to provide temperature responsive means whereby the temperature is elevated in delivery reservoir DR by simply supplying hot water from the supply reservoir SR. Toward this end the thermostat T closes its contacts and is arranged to energize the water pump through the switch S as is obvious from FIG. 11. Once the temperature in delivery reservoir DR reaches the desired level, the thermostat T opens the circuit to the water pump and circulation of hot water from the supply reservoir through pump P and conduit 8 is shut off. During the cycle controlled by thermostat T, the liquid level in delivery reservoir DR is maintained constant at a level determined by level control outlet 11. Of course the water level is maintained at a constant amount irrespective of whether the pump is under the control of thermostat T or under the control of the control system described above in connection with a dispensing cycle.

In order to flush hot water through the system as an aid in preserving proper sanitation, it is simply necessary to swing the switch S to the position S1, S2, S3 by swinging the operating arm A toward the left. This operation deenergizes the above described circuits and completes direct circuits to the valve V, the pump PM and to the whipper motor WM. Of course all circuits are deenergized by moving arm A to a position between that shown in FIG. 11 and the contacts S1, S2 and S3.

The embodiments of the invention in which an exclusive property or privilege is claimed are defined as follows:

I claim:

1. A liquid supply system comprising a delivery reservoir having a supply inlet, a supply outlet, and a level control outlet, a supply reservoir interconnected with said level control outlet through a return conduit and with said supply inlet through a supply conduit in series with a pump, and control means for controlling operation of said pump whereby liquid is drawn from said supply reservoir through said supply conduit to said delivery reservoir by said pump and whereby the level of liquid in said delivery reservoir is maintained substantially constant at a level determined by said level control outlet, the rate of flow of liquid into said delivery reservoir being at least as great as the rate of flow out of said delivery reservoir through said supply outlet and operation of said pump being initiated before the opening of said valve and operation of said pump being stopped after closing of said valve during a liquid dispensing cycle.

2. A liquid supply system comprising a delivery reservoir having a supply inlet, a supply outlet, and a level control outlet, a supply reservoir interconnected with said level control outlet through a return conduit and with said supply inlet through a supply conduit in series with a pump, control means for controlling operation of said pump whereby liquid is drawn from said supply reservoir through said supply conduit to said delivery reservoir by said pump and whereby the level of liquid in said delivery reservoir is maintained substantially constant at a level determined by said level control outlet, the rate of flow of liquid into said delivery reservoir being at least as great as the rate of flow out of said delivery reservoir through said supply outlet, and temperature responsive means arranged to respond to the temperature of liquid in said delivery reservoir to actuate said pump when such temperature drops to a predetermined level and to shut off said pump when such temperature rises to a predetermined level, said temperature responsive means being ineffective to shut off said pump during a liquid dispensing operation.